United States Patent
Ee et al.

(10) Patent No.: US 9,224,410 B1
(45) Date of Patent: Dec. 29, 2015

(54) SUSPENSION HAVING MICROACTUATOR GROUNDED TO OPPOSITE SIDE OF METAL SUPPORT LAYER

(71) Applicant: Magnecomp Corporation, Murrieta, CA (US)

(72) Inventors: Kuen Chee Ee, Chino, CA (US); Peter Hahn, Wildomar, CA (US); Long Zhang, Murrieta, CA (US)

(73) Assignee: MAGNECOMP CORPORATION, Murrieta, CA (US)

( * ) Notice: Subject to any disclaimer, the term of this patent is extended or adjusted under 35 U.S.C. 154(b) by 0 days.

(21) Appl. No.: 14/472,820

(22) Filed: Aug. 29, 2014

Related U.S. Application Data

(60) Provisional application No. 61/873,809, filed on Sep. 4, 2013.

(51) Int. Cl.
*G11B 5/48* (2006.01)
(52) U.S. Cl.
CPC .................................. *G11B 5/4826* (2013.01)
(58) Field of Classification Search
CPC .. G11B 5/5552; G11B 5/4826; G11B 5/4873; G11B 5/4853
USPC .................. 360/246.7, 291.9, 292, 294.4
See application file for complete search history.

(56) References Cited

U.S. PATENT DOCUMENTS

| | | | |
|---|---|---|---|
| 7,280,319 B1 | 10/2007 | McNab | |
| 7,751,153 B1 * | 7/2010 | Kulangara et al. | 360/294.6 |
| 8,248,734 B2 | 8/2012 | Fuchino | |
| 8,498,082 B1 * | 7/2013 | Padeski et al. | 360/294.4 |
| 8,630,067 B2 | 1/2014 | Ando et al. | |
| 2004/0183403 A1 * | 9/2004 | Uchiyama et al. | 310/328 |
| 2010/0073824 A1 * | 3/2010 | Nojima | 360/294.4 |
| 2010/0073825 A1 | 3/2010 | Okawara | |
| 2010/0085663 A1 * | 4/2010 | Ando et al. | 360/244.2 |
| 2010/0195252 A1 * | 8/2010 | Kashima | 360/294.4 |
| 2010/0264934 A1 * | 10/2010 | Inoue et al. | 324/537 |
| 2011/0096438 A1 | 4/2011 | Takada et al. | |
| 2011/0149440 A1 * | 6/2011 | Uematsu et al. | 360/245.3 |
| 2013/0321958 A1 * | 12/2013 | IKEJI et al. | 360/245.8 |

\* cited by examiner

*Primary Examiner* — Adam B Dravininkas
(74) *Attorney, Agent, or Firm* — Intellectual Property Law Offices of Joel Voelzke, APC

(57) ABSTRACT

In a dual stage actuated suspension, the conductive adhesive that forms the ground connection bridge from the ground electrode of the PZT microactuator to the grounded stainless steel layer of the flexure, extends from the ground electrode of the PZT around an edge of the stainless steel layer and to a side of the stainless steel layer that is opposite the side of the stainless steel layer to which the PZT is mounted. An aperture in the load beam allows a stream of hot air during the epoxy cure step to be directed directly onto the conductive epoxy ground connection bridge, thus allowing that conductive epoxy ground connection to be reliably and completely cured.

19 Claims, 5 Drawing Sheets

Bottom View

Top View

Bottom View

Top View

Bottom View

SUSPENSION HAVING MICROACTUATOR GROUNDED TO OPPOSITE SIDE OF METAL SUPPORT LAYER

CROSS-REFERENCE TO RELATED APPLICATIONS

This application claims the benefit of U.S. provisional patent application No. 61/873,809 filed Sep. 4, 2013.

BACKGROUND OF THE INVENTION

1. Field of the Invention

This invention relates to the field of suspensions for disk drives. More particularly, this invention relates to the field of structures and methods for grounding a microactuator to a suspension in a dual stage actuated (DSA) suspension.

2. Description of Related Art

As the track densities of hard disk drives (HDDs) continue to increase, the need to position the data read/write head over the spinning disk platter quickly and accurately has likewise increased. Dual stage actuated (DSA) suspensions have been developed in order to accommodate the demand for more expedient and accurate positioning of the read/write head.

In a DSA suspension, as for example in U.S. Pat. No. 7,459,835 issued to Mei et al. as well as many others, in addition to a voice coil motor which moves the entire suspension, at least one additional microactuator is located on the suspension in order to effect fine positional movements of the magnetic head slider keeping it properly aligned over the correct data track on the spinning disk. The microactuator(s) provide much finer control and higher bandwidth of the servo control loop than would a voice coil motor alone, which effects relatively coarse movements of the suspension and hence the magnetic head slider. A piezoelectric element, sometimes referred to simply as a PZT, is often used as the microactuator motor, although other types of microactuator motors are possible. In the discussion that follows, for simplicity the microactuator will be referred to simply as a "PZT," although it will be understood that the microactuator need not be of the PZT type.

DSA suspensions in which the PZT is located at or near the suspension gimbal are called gimbal-based DSA suspensions, or simply GSA suspensions. Generally speaking, GSA suspensions provide higher servo bandwidth than do DSA suspensions in which the PZT is located at the base plate or on the body of the load beam.

Without admitting that FIG. 1 is "prior art" within the legal meaning of that term, FIG. 1 is a bottom plan view of a prior GSA suspension 10 designed by the assignee of the present application, and FIG. 2 is a cross sectional view of the suspension of FIG. 1 taken along section line A-A', showing the details of the PZT mechanical and electrical bonding to the flexure. As used herein the term "bottom" refers to the side of a suspension or part thereof that faces the data storage disk, and "top" refers to the side of a suspension or part thereof that faces away from the data storage disk. The bottom side of a suspension is sometimes referred to as the slider side. The bottom side of the suspension and its components are therefore oriented toward the top of FIG. 2, and the top side of the suspension and its components are oriented toward the bottom of the figure.

Additionally, as used herein the term "proximal" means toward the actuator arm to which the suspension is mounted, and "distal" means toward the cantilevered end of the suspension to which the head slider is mounted.

In the figure, suspension 10 includes a load beam 12 and a flexure 20 affixed at the distal end 11 of load beam 12, typically by laser spot welding. Flexure 20 typically includes a metal support layer 24 which is typically stainless steel, an insulating layer 28 which is typically polyimide, and a signal conducting layer 30 of copper or copper alloy that includes various individual traces carrying information signals and voltages. Gold plating 32 over an exposed portion of the copper signal conducting layer 30 defines a gold contact pad 32 which carries the driving voltage for a PZT 70. A read/write head slider 60 is attached at a distal end 11 of suspension 10, on a gimbal tongue 62 which is part of a gimbal 40 on flexure 20. Gimbal 40 is formed from the stainless steel support layer 24, and includes PZT connector arms 42. Gimbal 40 allows head slider 60 to pitch, yaw, and roll freely as it travels over the disk platter to accommodate disk surface irregularities and vibrations.

PZT motor 70 includes a PZT element 74 together with top and bottom metallized surfaces on their respective top and bottom faces which form ground electrode 78 and driven electrode 76, respectively.

Driven electrode 76 on the bottom of PZT 70 is connected to gold plated contact pad 32 which provides the PZT driving signal or voltage, through conductive adhesive 48 which forms an electrically conductive bridge. Conductive adhesive 48 is typically a flowable hardenable conductive adhesive such as silver-containing conductive epoxy. Non-conductive adhesive 46, typically a non-conductive epoxy, provides the primary structural bonding and provides electrical insulation.

PZT top electrode 78 is electrically connected to the flexure's stainless steel layer 24 which is connected to ground, through conductive epoxy 50. Conductive epoxy 50 is sandwiched between PZT 70 and the gold plated pad 25 on stainless steel layer 24 of flexure 20.

Bottom electrode 76 of PZT 70 is thus the driven electrode which is connected to the driving voltage through a conductive epoxy bridge 48, and the top electrode 78 is the ground electrode that is connected to the grounded stainless steel body of flexure 20 through conductive epoxy 50 sandwiched between PZT 70 and stainless steel 24. Conductive epoxies 48 and 50 are typically cured by convection, and more typically by a heated air stream, although other types of adhesive such as UV-cured epoxy can be used.

When an actuation voltage is applied at gold contact pad 32, PZT 70 expands or contracts depending on whether the applied voltage is positive or negative. The proximal end of PZT 70 which is on the left side in the figure is relatively fixed, and the distal end which is on the right side of the figure is relatively freely moving. Actuation of PZT 70 thus causes the distal end of the PZT to move, which effects fine positional movements of head slider 60.

SUMMARY OF THE INVENTION

The inventors of the present invention have discovered that sometimes the electrical connection between the PZT and the stainless steel flexure is not as good as it should be, and that sometimes that electrical connection degrades or even fails completely over time under highly accelerated fatigue testing. The inventors have further identified a source of that problem as incomplete cure of the epoxy, due to the fact that conductive epoxy 50 that is sandwiched between PZT 70 and stainless steel layer 24 does not receive adequate heating during the curing process because PZT 70 and stainless steel layer 24 act as thermal insulators. Inadequate curing of conductive epoxy 50 can produce grounding degradation or even failure during epoxy fatigue reliability testing.

The inventors have invented a new structure and method for electrically bonding the PZT to the stainless steel that produces more complete curing of the conductive epoxy, and hence a higher quality and more robust electrical contact.

According to the invention, the conductive adhesive that forms the ground electrically conductive bridge to the grounded stainless steel layer of the flexure is relocated from between the PZT and the stainless steel to a location where it will receive sufficient heating (or other curing exposure) during the curing process in order to more completely and reliably cure that epoxy than with the prior design of FIGS. 1 and 2.

According to a first exemplary embodiment, the electrically conductive bridge for the ground connection defined by conductive epoxy extends from the PZT's ground electrode to the stainless steel surface of the flexure that is opposite from the side on which the PZT is mounted, rather than to the same side on which the PZT is mounted. Additionally, if necessary an aperture is formed in the load beam to which the flexure is affixed so that the conductive epoxy bridge can now be accessed and heated directly through that aperture.

This departure from the prior design is counterintuitive because the ground connection now has a longer run to make through the conductive epoxy. Upon first examination that design change would appear to create a higher resistance ground connection than before. However, because that conductive epoxy is now directly accessible by the heated air stream (or other curing exposure such as UV curing) during the epoxy cure step, that conductive epoxy can now be heated more completely during that step and thus the quality of that conductive epoxy bridge is improved, decreasing the possibility of a poor quality connection or even a complete failure of that bond over time and environmental conditions such as temperature cycling and vibration.

Because the epoxy that structurally bonds the distal end of the PZT to the flexure is no longer the primary electrical ground connection, that epoxy can be either conductive epoxy as in the prior design, or can be non-conductive epoxy.

In this first embodiment, the conductive epoxy that defines the ground bridge to the PZT is located at the distal end of the PZT, which is the end of the microactuator opposite the driving voltage connection to the PZT, as in the prior design.

In a slight variation that defines a second embodiment, the conductive epoxy that defines the ground bridge to the PZT is located at the proximal end of the microactuator. In this second embodiment, therefore, both the drive voltage and the ground connection are made at the proximal end of the PZT.

In a third illustrative embodiment, the PZT has a wrap-around electrode that wraps around to either the distal end of the PZT or a small portion of the bottom of the PZT, and the conductive epoxy that defines the ground connection extends from the bottom of the PZT to at least some part of the wrap-around portion of the electrode. In this embodiment the conductive epoxy that defines the ground connection can be accessed for heating from the same side of the suspension as the driving voltage connection, namely, the bottom side. Thus, the two conductive epoxy bridges can be cured from the same side.

The invention is not limited to use in a GSA suspension, that is, a suspension in which the PZT is mounted to a flexure and which acts directly on the gimbal. Rather, then invention can be applied to a suspension which the PZT is mounted to a base plate or a load beam, which represent generally older yet still viable designs.

DETAILED DESCRIPTION OF THE INVENTION

Figure 3:
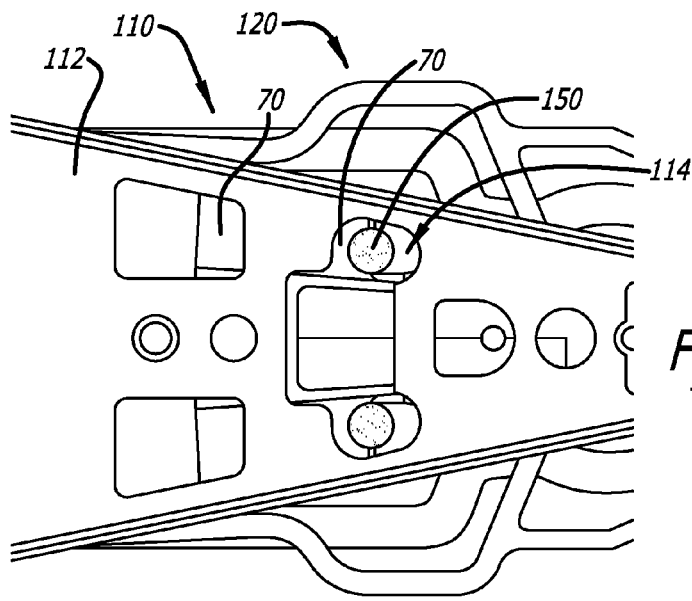
FIG. 3 is a top plan view of a GSA suspension of the invention according to a first embodiment.
Figure 4:
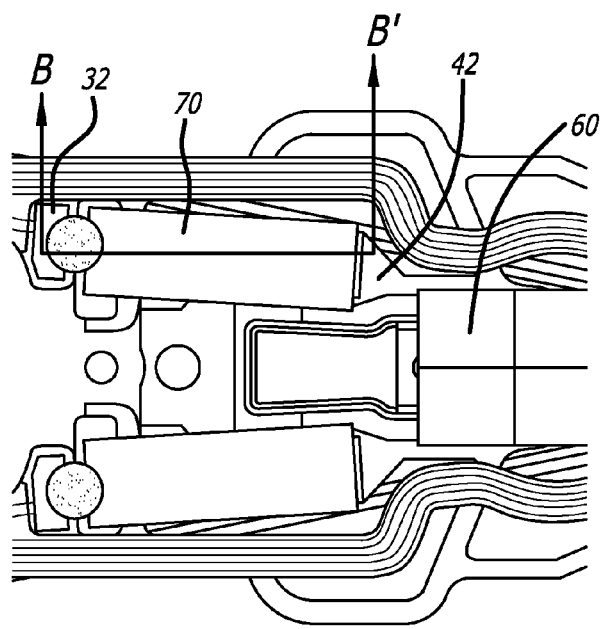
FIG. 4 is a bottom plan view of the GSA suspension of FIG. 3.

FIG. 3 is a top plan view of a GSA suspension 110 of the invention according to a first embodiment, and FIG. 4 is a bottom plan view thereof. Load beam 112 has been modified to provide an aperture 114 therein so that the new ground electrical connection 150 can be accessed for curing such as by directing a stream of hot air onto it for a thermally curing epoxy, or by shining UV light onto it for a UV-curing epoxy, or other exposure for other types of curing depending on the type of electrically conductive adhesive employed.

Figure 5:
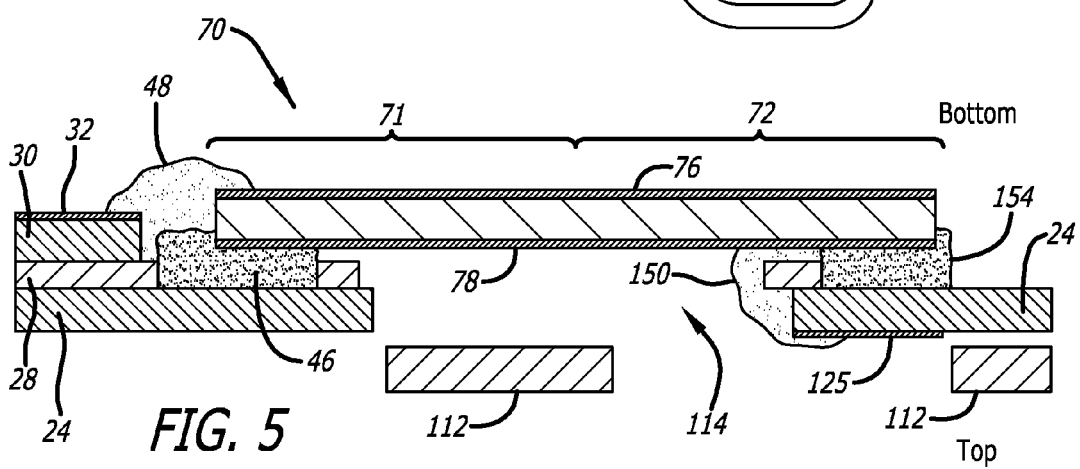
FIG. 5 is a sectional view of the GSA suspension of FIG. 4, taken along section line B-B'.

FIG. 5 is a sectional view of the GSA suspension of FIG. 4, taken along section line B-B'. In the figures, the PZT grounding has been modified. Specifically, the electrical bridge of conductive epoxy 150 that defines the grounding bridge at distal end 72 of PZT 70 is applied through the aperture or opening 114 in load beam 112 to create the electrical connection between the PZT top electrode 78 and a gold plating layer that defines a gold plated grounding pad 125 on the top surface of the stainless steel layer 24.

Figure 1:
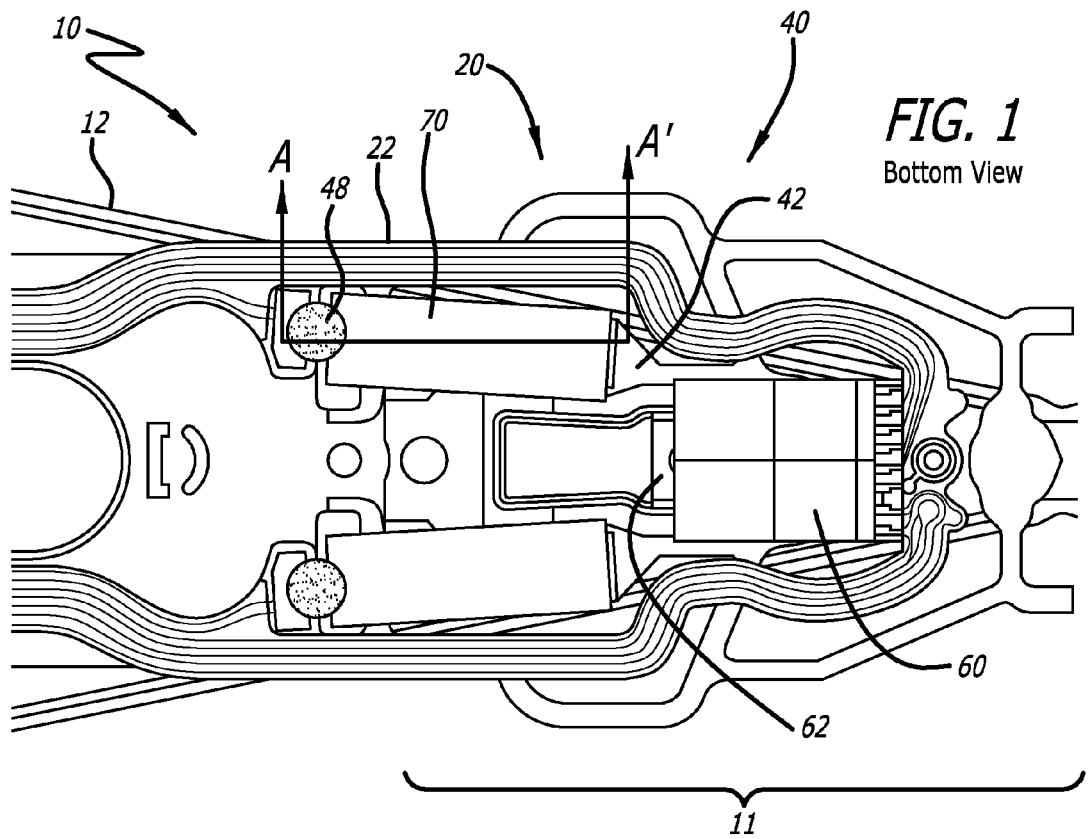
FIG. 1 is a bottom plan view of a prior GSA suspension.
Figure 2:
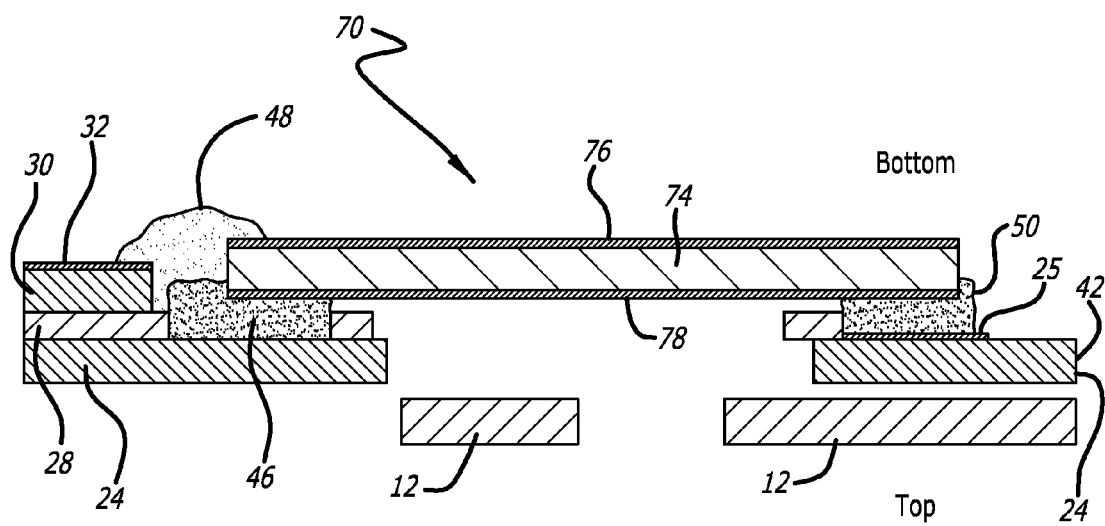
FIG. 2 is a sectional view of the GSA suspension of FIG. 1, taken along section line A-A".

In the prior design of FIG. 2, the conductive epoxy 50 that participated in the ground connection extended from the top face 78 of PZT 70 to the bottom surface of stainless steel layer 24 which is the face or surface of stainless steel layer 24 that faces the PZT. In the present invention by contrast, conductive epoxy 150 that participates in the ground connection extends from the top face 78 of PZT 70 to the face or surface of stainless steel layer 24 that is opposite the side facing the PZT. In the present invention, therefore, the driving voltage gold contact pad 32 and the gold ground pad 125 to which the driven and ground electrodes of PZT 70 are respectively connected are located on opposite sides, surfaces or faces of flexure 120. As used herein, the term "face" or "surface" of an element such as a copper layer 30 or stainless steel layer 24, includes any thin surface treatment including without limitation any gold or nickel plating. Furthermore, in this embodiment the gold contact pad 125 that defines the ground contact pad lies on the surface of stainless steel layer 24 that faces away from copper conducting layer 30, whereas in the prior design the gold contact pad 25 that defined the ground contact pad was disposed on the surface of the stainless steel layer that faced toward copper conductive layer 30. Thus the driven and ground electrodes of the microactuator are electrically connected to a driving voltage and to ground, respectively, at opposite faces of the flexure.

In the present invention the ground path of FIG. 5 through the conductive epoxy bridge 150 is at least nominally longer than in the prior design of FIG. 2. The conductive epoxy portion of a PZT's ground path is usually the highest resistance portion of that ground path, and thus the designer generally tries to minimize the length of that conductive epoxy portion. With the structure of the present invention including its longer conductive epoxy portion of the ground path, however, the conductive epoxy 150 that defines part of the grounding path is not sandwiched, but is more completely exposed to air and the convection heating provided by the air through aperture 114, and is thus able to obtain adequate heat during the epoxy curing process. Conductive epoxy bridge 150 is directly accessible through aperture 114 in load beam 112 for hardening by a stream of hot air blowing onto that bridge. As a result, the reliability of the conductive epoxy portion of the ground path is improved.

It is not necessary that the structural epoxy 154 that is sandwiched between the PZT 70 and the stainless steel 24 be non-conductive epoxy; rather, it could be conductive epoxy as well. As long as there is at least some conductive epoxy that is sufficiently exposed to air so as to produce full curing of the epoxy, the improvement of the present invention will be realized.

As in the prior design, driven electrode 76 on the bottom of PZT 70 is connected to gold plated contact pad 32 which provides the PZT driving signal or voltage, through conductive adhesive 48 which forms an electrically conductive bridge at the proximal end 71 of PZT 70.

Figure 6:
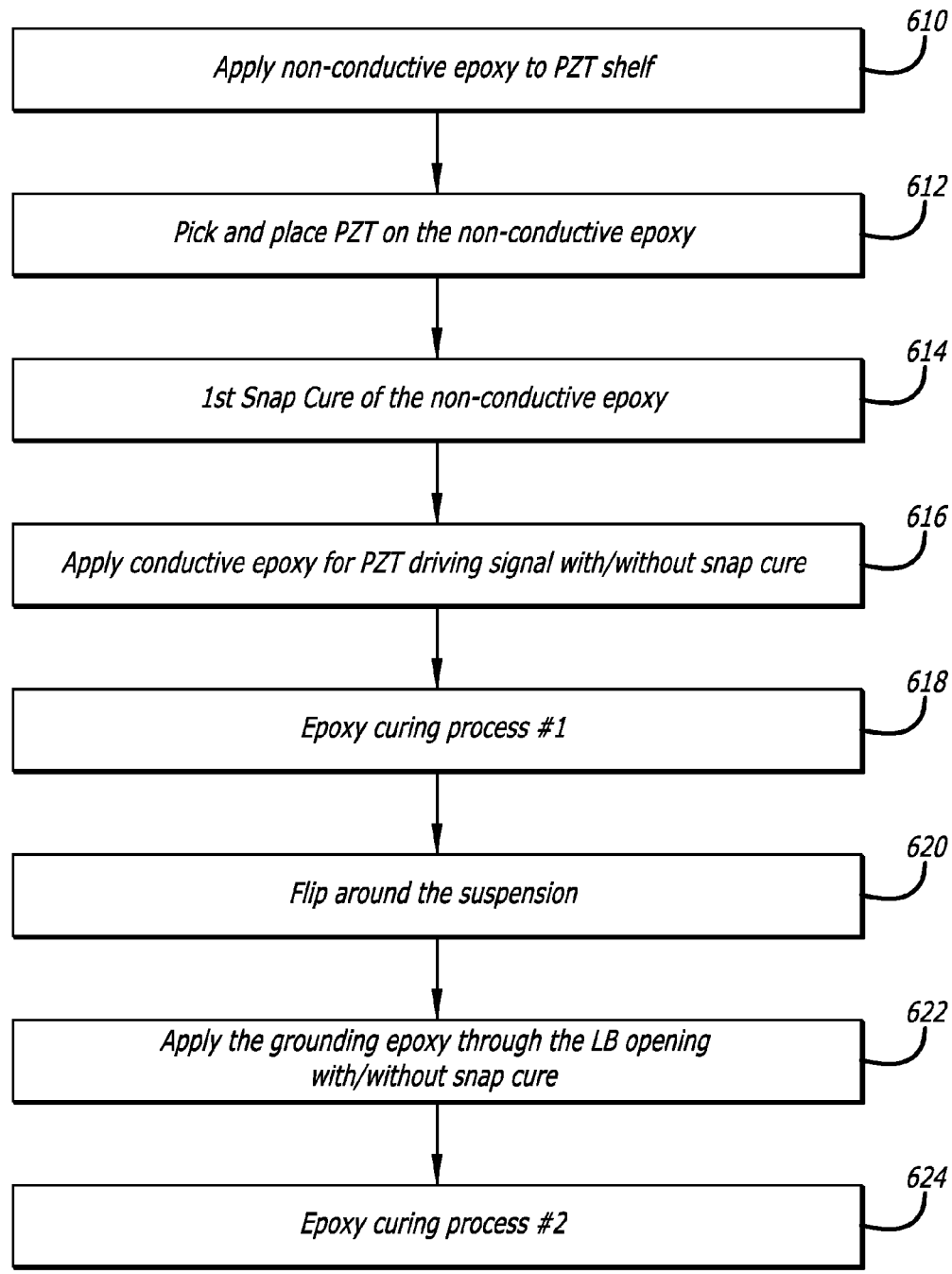
FIG. 6 is an assembly flow chart for the adhesive bonding and curing steps for the suspension of FIG. 3.

FIG. 6 is an assembly flow chart for the adhesive bonding and curing steps for the suspension of FIG. 3. Unlike the prior assembly process for GSA suspensions, according to the invention the PZTs are bonded first, and then the suspension is flipped over before applying the grounding epoxy. An extra curing process step is used in the illustrative embodiment in order to ground the PZT to the stainless steel. More specifically, the process according to the embodiment is as follows. At step 610 non-conductive epoxy 46 and 154 is applied to the shelf on the flexure, base plate, or load beam to which the PZT 70 is mounted. Alternatively, epoxy 154 could be conductive epoxy. At step 612 the PZT 70 is picked and placed onto the non-conductive epoxy 46 and 154. At step 614 the non-conductive epoxy is snap cured. At step 616 the conductive epoxy 48 for the PZT driving signal is applied, with our without a snap cure. At step 618 the first epoxy curing step is applied, usually by directing a stream of hot air onto the epoxy. At step 620 the suspension 110 is flipped over. At step 622 the grounding epoxy 150 is applied through the opening 114 in the load beam, with or without a snap cure. At step 624 the second epoxy curing step is applied, again usually by directing a stream of hot air onto the epoxy.

In the first embodiment, ground bridge 150 is located at the distal end 72 of PZT 70, away from the proximal end 71 at which the driving voltage conductive bridge 48 is located, as in the prior design. As will be seen in a second embodiment, the driving connection and the ground connection need not be located on opposite ends of PZT 70, but could be located at the same end of the PZT.

Figure 7:
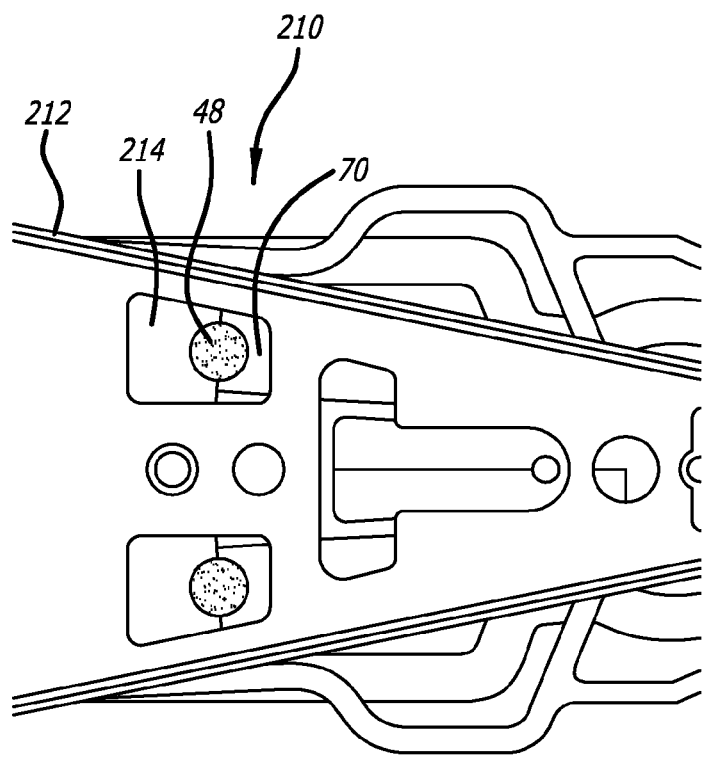
FIG. 7 is a top plan view of a GSA suspension of the invention according to a second embodiment.
Figure 8:
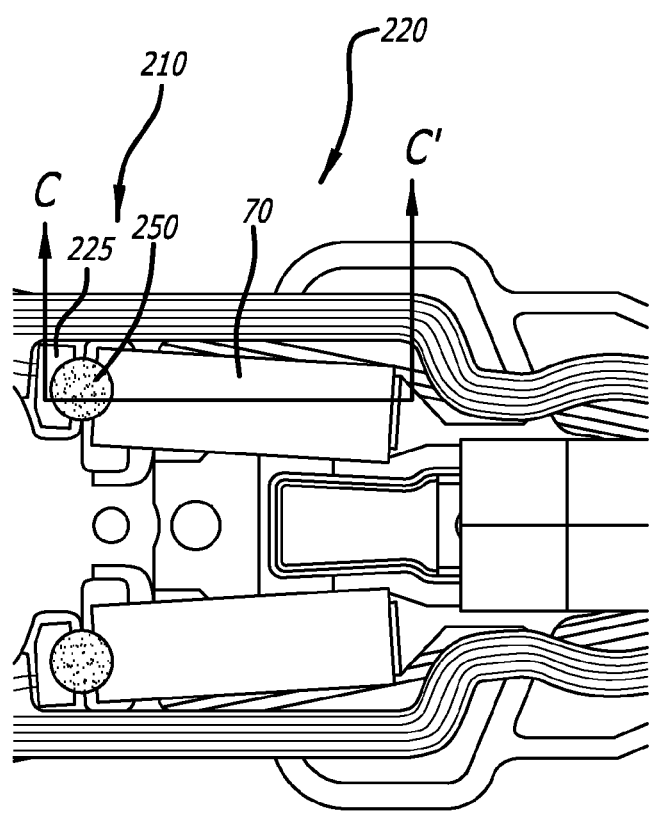
FIG. 8 is a bottom plan view of the GSA suspension of FIG. 7.
Figure 9:
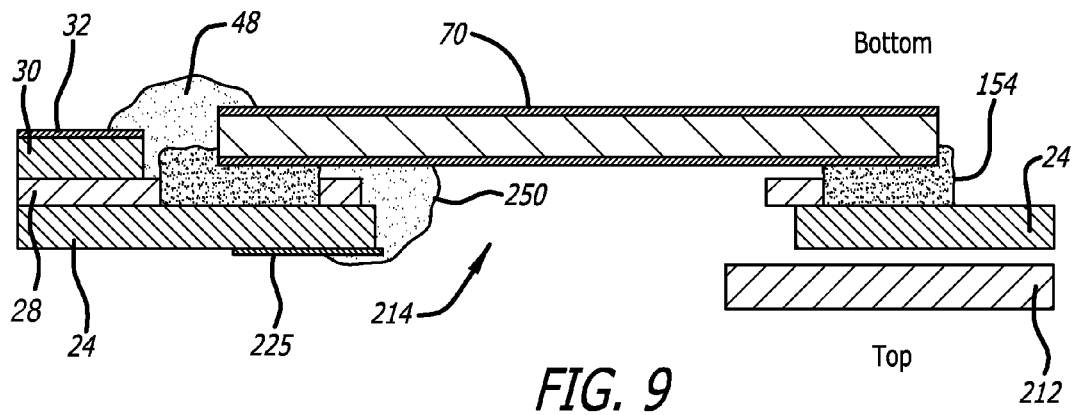
FIG. 9 is a sectional view of the GSA suspension of FIG. 8, taken along section line C-C'.

FIG. 7 is a top plan view of a GSA suspension 210 of the invention according to a second embodiment, and FIG. 8 is a bottom plan view thereof. FIG. 9 is a sectional view of the GSA suspension of FIG. 8, taken along section line C-C'. In this embodiment the grounding conductive epoxy 250 is applied at the proximal end of the PZT rather than at the distal end as in the first embodiment. Ground conductive epoxy bridge 250 extends to a gold bond pad 225 that has been plated onto the stainless steel layer 24 of flexure 220. As in the first embodiment, in this embodiment an aperture 214 is provided in the load beam 212, and the conductive epoxy 250 that forms a part of the ground path is completely exposed to the air through the aperture and hence is completely exposed to convection heating during the epoxy cure processes, allowing for quicker and more complete curing of the conductive epoxy than in the prior design. The conductive epoxy 250 in the ground path is thus completely cured, enhancing the reliability of the ground connection.

The assembly steps are the same for this embodiment as for the first embodiment. As with the first embodiment, the epoxy 154 that is sandwiched between the PZT 70 and the stainless steel 24 could be either conductive or non-conductive epoxy.

Figure 10:
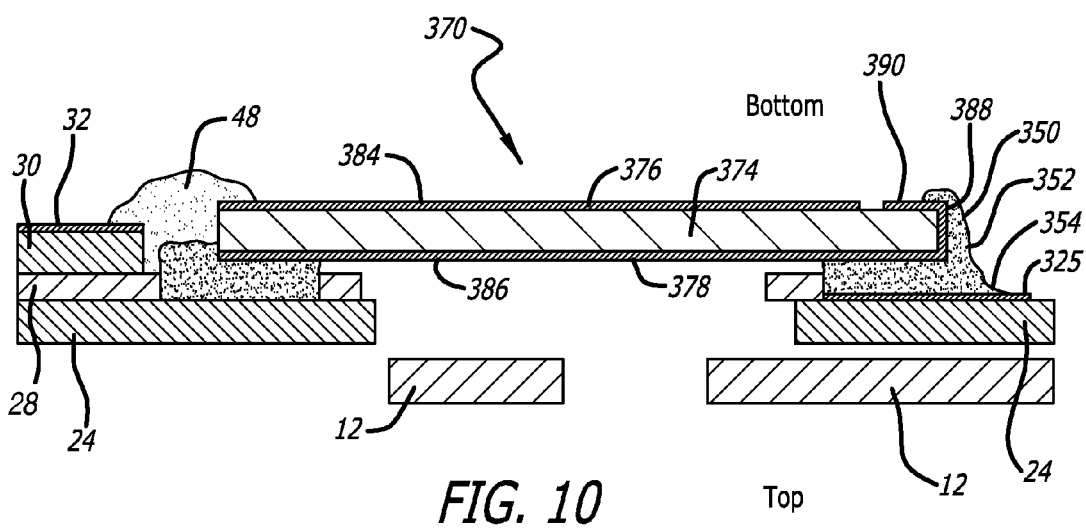
FIG. 10 is a sectional view of a third embodiment.

FIG. 10 is a sectional view of a third embodiment that employs a PZT 370 having a wrap-around electrode. PZT 370 has a PZT element 374, a bottom metalized surface 376 covering a majority 384 of its bottom surface and defining a first and driven electrode, and a second and ground electrode 378 that includes both a top surface 386 and either a side end 388 of PZT 370 and/or minority portion 390 of the PZT's bottom surface. As used herein, the term "wrap-around electrode" means an electrode that electrically extends from a first face to at least either the side end of the device, or to an opposite face of the device, or both. PZTs having such wrap-around electrodes are generally well known. Recent improvements in such devices and in methods of manufacturing such devices, and which could be employed in this embodiment, are disclosed in U.S. Pat. No. 8,773,820 issued to Hahn et al. and pending U.S. application Ser. No. 14/316,633 by Hahn et al., both assigned to the assignee of the present application, and both of which are incorporated herein by reference for their teachings of PZTs having wrap-around electrodes and methods of manufacturing the same.

In this embodiment conductive epoxy 350 extends from gold contact pad 325 on stainless steel layer 24, to the wrap-around portion of the electrode including side 388 and/or bottom minority portion 390. In this way the edge 352 of conductive epoxy 350 is fully exposed for curing. Edge 352 can also include a horizontally smeared-out portion 354 extending over gold bond pad 325 on stainless steel layer 24. The result is that at least the edge 352 of conductive epoxy 350 is fully exposed to the hot air stream during bonding, resulting in a high quality conductive epoxy bond and thus a high quality, reliable electrical bridge from gold ground pad 325 to at least the wrap-around portions 388 and/or 390 of PZT 370.

It will be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation. Similarly, unless the context dictates otherwise, the terms "distal" and "proximal" when used to refer to the ends of the PZT at which the electrical connections are made, should be understood to be terms used for convenience of discussion only rather than absolute terms.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. For example, the invention is equally applicable to bonding a PZT microactuator to a base plate or a load beam of a suspension rather than a flexure. The invention is also applicable to making electrical connections to other types of electrical components rather than merely PZT microactuators or even microactuators generally. The invention is applicable to types of adhesive other than epoxy, and to other methods of curing adhesives such as UV-curing. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A dual stage actuated suspension for a disk drive, comprising:
a head slider mounted to a distal end of the suspension;
a grounded metal layer having a first side and an opposite second side;
a microactuator mounted to the first side of the metal layer, the microactuator having:
a first face and an opposite second face, the two faces defining a driven electrode and a ground electrode, respectively; and
a proximal end and an opposite distal end;
wherein actuation of the microactuator causes the microactuator's distal end to move thereby effecting fine positional movements of the head slider; and
a first hardenable conductive adhesive bridge extending from the micro actuator's ground electrode through an opening in the grounded metal layer and to the second side of the grounded metal layer opposite the first side thereof to which the microactuator is mounted.

2. The suspension of claim 1 wherein the hardenable conductive adhesive comprises conductive epoxy.

3. The suspension of claim 1 wherein the hardenable conductive adhesive defines a first adhesive, and the suspension further comprises a second adhesive bonding the microactuator's ground electrode to the first side of the grounded metal layer.

4. The suspension of claim 3 wherein the second adhesive comprises non-conductive adhesive.

5. The suspension of claim 3 wherein the second adhesive comprises conductive adhesive.

6. The suspension of claim 1 wherein the second side of the grounded metal layer has gold plated thereon to define a gold plated grounding pad, and the hardenable conductive adhesive extends to the gold plated grounding pad.

7. The suspension of claim 1 further comprising a second hardenable conductive adhesive bridge extending from the microactuator's driven electrode to a driving voltage electrical contact pad that supplies a driving voltage for actuating the microactuator.

8. The suspension of claim 7 wherein the second hardenable conductive adhesive bridge is disposed at the proximal end of the microactuator, and the first conductive adhesive bridge is disposed at the distal end of the microactuator.

9. The suspension of claim 7 wherein the first and second hardenable conductive adhesive bridges are both disposed at a same end of the microactuator.

10. The suspension of claim 1 wherein the grounded metal layer to which the microactuator is mounted is a metal layer of a flexure.

11. The suspension of claim 1 wherein the grounded metal layer to which the microactuator is mounted is part of at least one of a load beam and a base plate.

12. The suspension of claim 1 wherein the first hardenable conductive adhesive bridge is directly accessible through an aperture in the suspension for hardening by a stream of hot air blowing directly onto said bridge.

13. A dual stage actuated suspension for a disk drive, comprising:
a beam;
a flexure affixed to the beam, the flexure comprising:
a stainless steel layer having a bottom surface and a top surface;
an insulating layer on the bottom side of the stainless steel layer; and
a signal conductor layer on a bottom side of the insulating layer;
a head slider affixed to a bottom of a gimbaled portion of the flexure;
a microactuator attached under the stainless steel layer for effecting fine positional movements of the head slider; and
a first electrical bridge comprising a flowable and hardenable conductive material extending from a top surface of the microactuator to a top surface of the stainless steel layer.

14. The suspension of claim 13 further comprising a gold pad on the top surface of the stainless steel layer of the flexure, the electrical bridge extending to the gold pad.

15. The suspension of claim 13 further comprising a second electrical bridge comprising a flowable and hardenable conductive material extending from a bottom surface of the microactuator to a bottom side of the signal conducting layer.

16. The suspension of claim 13 wherein:
the top surface of the stainless steel layer to which the first electrical bridge extends, has gold plating thereon defining a first gold contact pad to which the first electrical bridge is bonded; and
the signal conductor layer has gold plating thereon defining a second gold contact pad from which a second electrical bridge extends to a bottom surface of the microactuator;
whereby the microactuator's top surface is electrically bridged to a first gold contact pad on the top surface of the stainless steel layer, and the microactuator's bottom surface is electrically bridged to the second gold contact pad on a bottom surface of the signal conducting layer, the two gold contact pads being on opposite sides of the flexure.

17. A dual stage actuated suspension for a disk drive, comprising:
a flexure comprising a stainless steel support layer, an insulating layer, and a copper conducting layer;

a first gold contact pad on a surface of the stainless steel support layer facing away from the copper conducting layer;

a second gold contact pad on a surface of the copper conducting layer facing away from the stainless steel support layer;

a microactuator having a driven electrode and a ground electrode;

a first electrical connection from the first gold contact pad to the microactuator's ground electrode; and a second electrical connection from the second gold contact pad to the microactuator's driven electrode;

whereby the driven and ground electrodes of the microactuator are electrically connected to a driving voltage and to ground, respectively, at opposite faces of the flexure.

18. The suspension of claim 17 wherein the first and second electrical connections comprise a flowable and hardenable conductive adhesive.

19. The suspension of claim 17 wherein additional adhesive bonds the microactuator's ground electrode to a surface of the stainless steel support layer facing the copper conducting layer.

* * * * *

UNITED STATES PATENT AND TRADEMARK OFFICE
CERTIFICATE OF CORRECTION

| | | |
|---|---|---|
| PATENT NO. | : 9,224,410 B1 | Page 1 of 1 |
| APPLICATION NO. | : 14/472820 | |
| DATED | : December 29, 2015 | |
| INVENTOR(S) | : Kuen Chee Ee et al. | |

It is certified that error appears in the above-identified patent and that said Letters Patent is hereby corrected as shown below:

In the claims,

In claim 13, column 8, line 28, delete "side" and insert -- surface --.

In claim 13, column 8, line 40, delete "to a top" and insert -- to the top --.

Signed and Sealed this
Twenty-second Day of March, 2016

Michelle K. Lee
*Director of the United States Patent and Trademark Office*